(12) United States Patent
Hatton et al.

(10) Patent No.: US 6,774,250 B1
(45) Date of Patent: Aug. 10, 2004

(54) PROCESS FOR THE PREPARATION OF REACTION PRODUCTS OF CYCLOALIPHATIC EPOXIDES WITH MULTIFUNCTIONAL HYDROXY COMPOUNDS

(75) Inventors: Kevin B. Hatton, Hertfordshire (GB); Pauline G. Barker, Cambridge (GB); Claus W. Rabener, Weil-am-Rhein (DE); Christiane Rabener, Weil-Ötlingen (DE)

(73) Assignee: Huntsman Advanced Materials Americas Inc., Salt Lake City, UT (US)

( * ) Notice: Subject to any disclaimer, the term of this patent is extended or adjusted under 35 U.S.C. 154(b) by 0 days.

(21) Appl. No.: 10/018,667

(22) PCT Filed: Jun. 6, 2000

(86) PCT No.: PCT/EP00/05170

§ 371 (c)(1),
(2), (4) Date: Aug. 2, 2002

(87) PCT Pub. No.: WO00/77066

PCT Pub. Date: Dec. 21, 2000

(30) Foreign Application Priority Data

Jun. 12, 1999 (GB) .............................................. 9913627

(51) Int. Cl.[7] ........................ C07D 303/00; C08G 59/68

(52) U.S. Cl. ........................ 549/546; 549/547; 568/609; 568/619; 568/648

(58) Field of Search ................................. 549/546, 547; 568/609, 619, 648; 528/92, 110, 406, 408, 410, 416, 418, 421

(56) References Cited

U.S. PATENT DOCUMENTS

| 3,398,102 A | 8/1968 | Soldatos et al. ................ 260/2 |
| 4,115,295 A | 9/1978 | Robins et al. ................. 528/90 |
| 5,316,106 A | 5/1994 | Baedke et al. ............. 184/6.12 |

FOREIGN PATENT DOCUMENTS

| EP | 0 105 488 A2 | 4/1984 |
| EP | 0 493 916 B1 | 3/1997 |

Primary Examiner—Ba K. Trinh
(74) Attorney, Agent, or Firm—Proskauer Rose LLP; Tiffany A. Levato; Kristin H. Neuman

(57) ABSTRACT

The invention relates to the process for the preparation of liquid reaction products of cycloaliphatic epoxides with mono- or multifunctional hydroxy compounds. The process comprises reacting a polyfunctional cycloaliphatic epoxy resin with a mono- or multifunctional hydroxy compound in the presence of a heterogeneous surface-active catalyst. The invention also relates to curable compositions containing the product obtained by the process.

10 Claims, No Drawings

PROCESS FOR THE PREPARATION OF REACTION PRODUCTS OF CYCLOALIPHATIC EPOXIDES WITH MULTIFUNCTIONAL HYDROXY COMPOUNDS

This application is a 371 of PCT/EP00/05170 filed on Jun. 6, 2000.

The present invention relates to the preparation of liquid reaction products of cycloaliphatic epoxides with multifunctional hydroxy compounds, the use of the product as obtained by the process for preparing a curable composition, the curable composition and its use.

The reaction between alcohols and cycloaliphatic epoxides in the presence of an heterogeneous catalyst is known. For example G. H. Posner et al., describe in *Tetrahedron Letters* No. 42, 3597–3600, 1975 the reaction of alcohols with cyclohexene oxide using W-200 alumina to form the corresponding trans-2-alkoxycyclohexanols in good yields. This process uses an excess of the alcohol wherein only monofunctional materials are used.

The reaction of low molecular weight glycidyl epoxy materials with polyhydric compounds in the presence of a homogeneous catalyst is known. This process converts low molecular weight glycidyl epoxy materials of high epoxide content into higher molecular weight material of reduced epoxide content.

For example, U.S. Pat. No. 4,543,430, discloses a process for the preparation of addition products of epoxides and hydroxylated compounds, the epoxide being an alkylene oxide or epichlorhydrin, and the hydroxylated compound being an alcohol, an alkyleneglycol monoalkyl ether, a pheriol or water. The ratio of the hydroxylated compound to the epoxide ranges from 2 to 20 percent by weight. The reaction is carried out in a homogeneous liquid phase at a temperature between 40° and 250° C. in the presence of a catalyst. The catalyst is a) a tetraalkylammonium triflate (trifluormethanesulphonate) or b) a triflic acid (trifluormethanesulphonic acid) salt of a metal selected from an alkali metal salt, an alkali earth metal salt, aluminum, cobalt, nickel, zirconium and tin. The amount of catalyst used is such that the catalyst concentration in the reaction mixture ranges from 1 to 100 ppm by weight it is stated at col. 1, lines 15 to 17, that the product preferably being sought is generally an addition product comprising a single unit derived from the epoxide, per molecule. Such products will be of low molecular weight.

U.S. Pat. No. 5,362,835 discloses the addition reaction of an epoxide with a dihydroxy compound in the presence of a triflate salt of a metal of Group IIA, IIB, IIIA, IIIB or VIIIA of the Periodic Table of Elements. The drawback of this process is seen in the fact that the triflate salt catalyst has to be deactivated in a separate reaction step.

It has now been found that the use of surface-active heterogeneous catalysts avoids the deactivation and loss of the homogeneous catalyst.

The present invention relates to the advancement of polycycloaliphatic epoxides with multifunctional alcohols, which produces, under controlled conditions in the presence of surface-active heterogeneous catalysts, materials having increased molecular weights and terminated by cycloaliphatic epoxy groups. The resulting advanced epoxides are liquid with measurable epoxide content greater than 0.1 mol/kg. In a preferred embodiment, the advanced epoxides have an epoxide content greater than 1.5 mol/kg, in particular greater than 2.0 mol/kg.

Subject matter of the present invention is a process for the preparation of reaction products of cycloaliphatic epoxides with mono- or multifunctional hydroxy compounds which comprises reacting a polyfunctional cycloaliphatic epoxy resin with a mono- or a multifunctional hydroxy compound in the presence of a heterogeneous surface-active catalyst selected from the group consisting of activated aluminum hydroxide, hydrated aluminum oxide, amorphous silica, activated carbon and cationic ion exchange resins and isolating the reaction product.

The polyfunctional epoxy resins of this invention are cycloaliphatic and contain the epoxy group of the formula:

(I)

wherein R is a straight chain $C_2$–$C_6$ alkylene group, especially $C_4$-alkylene which may be substituted by additional substituents, such as $C_1$–$C_4$ alkyl. These epoxy resins may be formed by reaction of peracetic acid with olefinic esters of cycloaliphatic compounds. Some preferred cycloaliphatic epoxy resins are diepoxides and include but are not limited by the following:

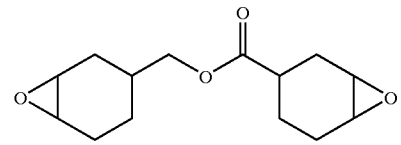

3,4-epoxycyclohexylmethyl-3,4-epoxycyclohexane carboxylate,

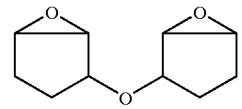

bis(2,3-epoxycyclopentyl)ether,

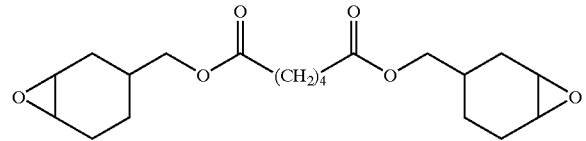

bis(3,4-epoxycyclohexyl methyl)adipate, and

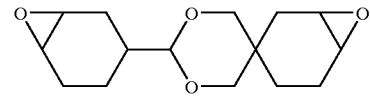

2-(3,4-epoxycyclohexyl-5,5-spiro)-(3,4-epoxy)cyclohexane-m-dioxane. Diepoxides containing non-terminal epoxide groups may also be employed, such as vinylcyclohexene dioxide, limonene dioxide, dicyclopentadiene oxide, 4-oxatetracyclo[6,2,1,0$^{2,7}$0$^{3,5}$]undec-9-yl glycidyl ether, bis(4-oxatetracyclo[6,2,1,0$^{2,7}$0$^{3,5}$]undec-9-yl) ether of ethylene glycol, 3,4-epoxycyclohexylmethyl-3,4-epoxycyclohexanecarboxylate and its 6,6$^1$-dimethyl derivative, bis(3,4-epoxycyclohexanecarboxylate) of ethylene glycol and 3-(3,4-epoxycyclohexyl)-8,9-epoxy-2,4 dioxaspiro[5,5]undecane.

In a preferred embodiment of the process the polyfunctional cycloaliphatic epoxy resin is selected from the group consisting of 3,4-epoxycyclohexylmethyl-3,4-epoxycyclohexane carboxylate and bis (3,4-epoxycyclohexyl methyl) adipate carboxylate.

The mono- or multifunctional hydroxyl compounds used according to the process of the present invention may contain primary, secondary or tertiary alcohols.

Preferred hydroxyl compounds are those having the formula:

$$Q(OH)_n \quad (II)$$

in which Q is an aliphatic, cycloaliphatic or araliphatic residue and n are integers from 1 up to 128. When Q is an aliphatic residue, it may be a straight or branched chain $C_2$–$C_{12}$ alkylene residue.

Cycloaliphatic residues 0 are preferably $C_5$–$C_8$ cycloalkylene residues in which the cycloalkylene group may be substituted by substituents such as $C_1$–$C_4$ alkyl or several cycloalkylene residues may be bonded together via a bridge member, e.g. a methylene bridge.

Araliphatic residues are preferably optionally ring-substituted benzyl residues or naphthyl methylene residues.

Each of the residues Q may be substituted or interrupted provided that the substituent groups or interrupting atoms do not deactivate the heterogeneous catalyst, or undergo competing reactions with the liquid epoxy. Examples of suitable substituent groups are ester groups as contained in polycaprolactones and unsaturated groups as contained in hydroxy-terminated polybutadienes or polybutadiene polymers.

The alcohols mentioned above may be substituted by alkoxy groups as well as higher polyoxyethylene glycol, polyoxypropylene glycol, polyoxytetramethylene glycol and polycaprolactone groups based on such alcohols.

Specific examples of preferred aliphatic hydroxy compound reactants of formula II (where n=1) include methanol, ethanol, propanol, butanol and such straight chain or branched alcohols up to and including $C_{12}$ alkanols.

Specific examples of cycloaliphatic alcohols include cyclopentanol, cyclohexanol and cycloheptanol as well as such alcohols substituted by $C_1$–$C_4$ alkyl and/or alkoxy groups.

Araliphatic alcohols which may be mentioned include benzyl alcohol and phenoxy ethanol which both may have ring substitution such as $C_1$–$C_4$ alkyl and/or alkoxy groups, halogens such as F, Cl, Br, I or other groups provided that the substituent groups do not deactivate the heterogeneous catalyst, or undergo competing reactions with the liquid epoxy.

Specific examples of preferred aliphatic dihydroxy compounds reactants of formula II (where n=2) include ethylene glycol, diethylene glycol, triethylene glycol and higher polyoxyethylene glycols; propane-1,2-diol; propane-1,3-diol and higher propoxylene glycols; butane-1,4-diol and higher polyoxytetramethylene glycols; polycaprolactone diols; neopentyl glycol; pentane-1,5-diol; hexane-1,6-diol and octane-1,8-diol.

Specific examples of preferred cycloaliphatic diols are e.g. quinitol, resorcitol, bis (4-hydroxycyclohexyl) methane, 2,2-bis(4-hydroxycyclohexyl) propane, cyclohexane dimethanol and 1,1-bis(hydroxymethyl)cyclohex-3-ene and 4,9-bis(hydroxymethyl)tricyclo[5,2,1,0$^{2,6}$]decane.

Araliphatic dial reactants which may be mentioned are 1,4-benzenedimethanol and 4,4'-bis(hydroxymethyl) biphenyl.

Specific examples of preferred aliphatic trihydroxy compounds reactants of formula II (where n=3) include glycerol, higher polyethylene glycols based on glycerol, higher polyoxypropylene glycols based on glycerol and polycaprolactone trials also based on glycerol.

Specific examples of preferred aliphatic tetrahydroxy compounds reactants of formula II (where n=4) include pentaerythritol, higher polyethylene glycols based on pentaerythritol and higher polyoxypropylene glycols based on pentaerythritol.

Specific examples of preferred aliphatic multihydroxy compounds of formula II (where n>4) include a range of dendritic polyols produced by Perstorp Polyols and sold under the Trade Name Boltorn (TM) Dendritic Polymers. These include BOLTORN H20, H30, H40 and H50 (OH functionalities=16, 32, 64 and 128 respectively; and Molecular Weights=1800, 3600, 7200 and 14400 respectively).

In a preferred embodiment of the process the multifunctional hydroxy compound is selected from the group consisting of pentaerythritol ethoxylate, polyethylene glycol, polytetrahydrofuran, polycaprolactone diol or triol tripropylene glycol, glycerol propoxylate and dendritic polyols.

The ratio of the number of moles of the hydroxy function to the number of moles of the cycloaliphatic epoxy function at the start of the reaction is critical for obtaining products with low viscosity and little polymeric side product. The molar ratio of the hydroxy function to the cycloaliphatic epoxide is usually in the range 1:2 to 1:10, especially from 1:3 to 1:5.

The heterogeneous surface-active catalyst used in the process according to the present invention is selected from the group consisting of activated aluminum hydroxide, hydrated aluminum oxide, amorphous silica, activated carbon and cationic ion exchange resins. In this context, it is understood that the heterogeneous catalyst is one which is insoluble in the reaction mixture.

Activated aluminum hydroxide preferably is porous, solid aluminum hydroxide having the general formula $Al_2O_{(3-x)}(OH)_{2x}$ where x ranges from about 0 to 0.8, prepared by thermal treatment of aluminum hydroxide precursors. The term activated alumina refers to thermal decomposition products of aluminum trihydroxides, oxide hydroxides, and non-stoichiometric gelatinous hydroxides. The term activation indicates a change of surface properties resulting from heating. Other names are active alumina, gamma alumina, catalytic alumina, and transition alumina. These products may be prepared by activation of aluminum hydroxide, rehydrated alumina or pseudoboehmite gel. Other methods include roasting of aluminum chloride and calcination of precursors such as ammonium alum ($AlH_7NO_8S_2$). Activated aluminum hydroxide may be prepared by thermal treatment of gibbsite from the Bayer process and subsequent rehydration. Gel-based activated alumina can be formed by wet chemical reaction of soluble aluminum compounds, e.g. mixing of aluminum sulfate and sodium aluminate solutions, or by hydrolysis of aluminum alkoxides. Reference is made to Kirk-Othmer, *Encyclopedia of Technology*, Fourth Edition, John Wiley & Sons, Vol. 2, page 291, entry Aluminum oxide (Alumina). Hydrated aluminum oxide is preferably selected from the group of aluminum hydroxides consisting of crystalline aluminum hydroxide and gelatinous crystalline aluminum hydroxide. Suitable aluminum hydroxides are trihydroxides and oxide-hydroxides selected from the group consisting of gibbsite, bayerite, nordstrandite, boehmite and diaspore. The term gelatinous crystalline aluminum hydroxide covers a range of products in which colloidal hydrated alumina is the predominant solid phase and which may be classified as amorphous or gelatinous boehmite. Reference is made particularly to the properties of these products and the methods for preparing them as described in Kirk-Othmer, *Encyclopedia of Technology*, Fourth Edition, John Wiley & Sons, Vol. 2, page 317, entry Aluminum oxide (Hydrated).

Amorphous silica does not have a crystalline structure as defined by X-ray diffraction measurements. Amorphous silica, which can be naturally occurring or synthetic, is preferably microamorphous silica, e.g. silica sols, gels, powders and porous glasses. These consist of ultimate particles of the inorganic polymer $[(SiO_2)_n(n=\infty)]$ where a silicon atom is covalently bonded in a tetrahedral arrangement to four oxygen atoms. Each of the four oxygen atoms is covalently bonded to at least one silicon atom to form either a siloxane (—Si—O—Si—) or a silanol (—Si—OH) functionality. Amorphous silica is preferably selected from the group of surface-active silica consisting of silica sols or colloidal silica, silica gels, precipitated silica and pyrogenic or fumed silica.

Silica sols or colloidal silica consist of a stable aqueous dispersion or sol of discrete amorphous silica particles having diameters of about 1 to 100 nm. Silica gel is a coherent, rigid, continuous three-dimensional network of spherical particles of colloidal silica. Both, siloxane and silanol functionalities are present. Silica gels are classified into three types, regular, intermediate, and low density gels and may be dried or pulverised. Surfaces can be categorised, as fully hydroxylated, in which the surface consists solely of silanol, a siloxane or a modified organic surface. Silanol surfaces are formed by drying silica gels or precipitates from water at temperatures below 150° C. These surfaces are wetted by water. Hydroxylated surfaces heated from 300–1000° C. progressively develop a siloxane surface by dehydration.

Precipitated silica may contain up to 10% water as surface silanol. It is composed of aggregates of particles of colloidal-size silica that have not become linked in a massive gel network during the preparation process and is made by precipitation from solution to form precipitated silica. The surface area can range from 5 to 50 nm in diameter. Aggregates are three dimensional clusters of particles which range up to approximately 500 nm in diameter. The particles in aggregates are covalently bonded to one another via siloxane bond formation. The aggregate particles can also be agglomerated through hydrogen bonding thus affording structures that can range up to approximately 100 $\mu$m in diameter. The median agglomerate particle size is generally 20 to 50 $\mu$m, but can be reduced in size by milling to approximately 1 $\mu$m.

Pyrogenic or fumed silica Particulate silica is made from the vapor phase and is an amorphous, white powder that is also composed of aggregates of particles of colloidal-size silica, but is generally less dense and of higher purity than silica precipitated from solution. Surface silanol density normally ranges from about 2–4/nm$^2$ of surface area. Fumed silica has a surface area of <300 m$^2$/g, a particle size diameter in the 100 nm to 2 $\mu$m range and is essentially non-porous. Reference is made particularly to Kirk-Othmer, *Encyclopedia of Technology*, Fourth Edition, John Wiley & Sons, Vol. 21, page 1000, entry Amorphous silica; page 1017, entry Silica Sols and Colloidal Silica; page 120, entry Silica Gel; page 1023, entry Precipitated Silica; and page 1026, entry Pyrogenic silica.

Activated carbon is a predominantly amorphous solid that has a large internal surface and pore volume. Different types or commercial products may be employed containing predominantly micropores (pore width <2 nm), mesopores (pore width 2–50 nm) and macropores (pore width >50 nm). The surface area of activated carbon is in the range of 500–2000 m$^2$/g. Liquid-phase activated carbon is preferred in powder, granular or shaped form. The average size of powdered particles is 15–25 $\mu$m. Granular or shaped carbon particle size is about 15–25 $\mu$m. Reference is made particularly to Kirk-Othmer, *Encyclopedia of Technology*, Fourth Edition, John Wiley & Sons, Vol. 4, page 1015, entry Activated carbon.

In a preferred embodiment of the process a cationic ion exchange resin is used. Suitable cationic ion exchange resins are macroporous or microporous, crosslinked sulphonated polystyrene or crosslinked polyacrylic cationic ion exchange resins. They are produced from styrene-divinylbenzene copolymers which have been functionalised with sulphonyl groups or (meth)acrylic-divinylbenzene copolymers.

The structure of the ion-exchange resins is either microporous or macroporous. Microporous resins are commonly referred to as gel or gelular-type resins. Macroporous resins are also called macroreticular. Typical resins have a diameter of 0.3 to 1.2 mm. Reference is made particularly to Kirk-Othmer, *Encyclopedia of Technology*, Fourth Edition, John Wiley & Sons, Vol. 14, page 737, entry Ion exchange. The amounts of the above-mentioned catalyst used in the process of the present invention are between 1–60%, especially 5–50%, and most preferably 15–30%, based on the total weight of the reaction mixture.

During the course of the process of the present invention, secondary alcohol is generated by reaction of the alcohol starting material with the epoxy resin. As the reaction progresses this alcohol can itself react with the epoxy resin and would in time cause complete loss of all epoxy function in the reaction mixture. As the process allows for the simple removal of the catalyst (e.g. by cooling and filtration) the reaction is effectively halted and the process is stopped at any point during the reaction.

The reaction of the polyfunctional cycloaliphatic epoxy resin with the multifunctional hydroxy compound in the presence of a heterogeneous surface-active catalyst may proceed at room temperature, preferably, at an elevated temperature comprised between 60° C. and 250° C., particularly between 80° C. and 150° C. Subsequent steps of the process comprise cooling the reaction mixture, removing the catalyst, and isolating the reaction product having increased molecular weight and being terminated by cycloaliphatic epoxy groups.

The present invention also relates to the product obtained by the above-mentioned process and to the use of this product for preparing a curable composition.

The present invention also relates to a curable composition which comprises a) the product as obtained by the process according to claim 1; and b) a curing agent.

The curable composition may also contain suitable plasticisers such as dibutyl phthalate and dioctyl phthalate, inert diluents such as tar and bitumen and so-called reactive diluents, especially monoepoxides, such as n-butyl glycidyl ether, iso-octyl glycidyl ether, phenyl glycidyl ether, cresyl glycidyl ethers, glycidyl esters of mixed tertiary, aliphatic, monocarboxylic acids, glycidyl acrylate and glycidyl methacrylate. They may also contain additives such as fillers, reinforcing materials, polymeric toughening agents such as polyether sulphones, phenoxy resins, and butadieneacrylonitrile rubbers, colouring matter, flow control agents, flame inhibitors, and mould lubricants. Suitable extenders, fillers and reinforcing materials are for example, glass fibres, carbon fibres, fibres of aromatic polyamides, ballotini, mica, quartz flour, calcium carbonate, cellulose, kaolin, wollastonite, colloidal silica having a large specific surface area, powdered polyvinyl chloride and powdered polyolefin hydrocarbons such as polyethylene and polypropylene.

The present invention also relates to a process for preparing a curable composition, which comprises a') treating the product as obtained by the process mentioned above with b') a heat-curable curing agent or an ultraviolet (UV)-curable curing agent.

The use of the curable composition as adhesives, primers for adhesives, laminatng and casting resins, moulding compositions, putties and sealing compounds, potting and insulation compounds, as coatings or stereolithographic type applications is also subject matter of the present invention.

The process is performed in a manner known per se. The curing agent may be a heat curable curing agent or an ultraviolet (UV) curable curing agent.

The heat-curable curing agent component b) according to process step b'), may be one of the variety of known epoxy curing agents. Examples of suitable curing agents, especially for cycloaliphatic epoxides, are carboxylic acids or anhydrides such as phthalic anhydride, hexahydrophthalic anhydride, methylhexahydrophthalic anhydride, tetrahydrophthalic anhydride, methyl tetrahydrophthalic anhydride, 5-methylbicyclo[2,2,1] hept-5-ene-2,3-dicarboxylic acid anhydride, pyromellitic dianhydride, trimellitic anhydride, maleic anhydride and dodecenyl succinic anhydride, dimer or trimer acids derived from unsaturated fatty acids; and mixtures thereof.

The amount of the heat curing agent may be varied over a range depending on the curing agent used is understood by those skilled in the art. Where anhydride curing agents are used, it may be desirable to add a small amount (0.1 to 5 parts by weight, per 100 parts of component b)) of an accelerator such as a tertiary amine, an alkaline metal alkoxide, stannous octoate, sulphide or phosphine, to hasten cure.

The compositions of this invention may be cured by heating them at a suitable temperature from about 0° to 250° C., which will vary on the nature of the curing agent. The length of the curing process will also vary according to the type of the curing agent but will range from 15 minutes to 7 days.

The above-mentioned additives may be added to the curable composition. The heat curable compositions of this invention may be used as adhesives, primers for adhesives, laminating and casting resins, moulding compositions, putties and sealing compounds, potting and insulation compounds for the electrical industry, but especially as coatings.

With respect to the cure of the present invention with UV-curable curing agents, any compound that acts as cationic photoinitiator and generates an acid on exposure to actinic irradiation may be used for the preparation of the compositions of the invention. The acid generated may be a so-called Lewis acid or a so-called Broensted acid.

Suitable acid generating compounds include so-called onium salts and iodosyl salts, aromatic diazonium salts, metallocenium salts, o-nitrobenzaldehyde, the polyoxymethylene polymers described in U.S. Pat. No. 3,991, 033, the o-nitrocarbinol esters described in U.S. Pat. No. 3,849,137, the o-nitrophenyl acetals, their polyesters, and end-capped derivatives described in U.S. Pat. No. 4,086,210, sulphonate esters of aromatic alcohols containing a carbonyl group in a position alpha or beta to the sulphonate ester group, N-sulphonyloxy derivatives of an aromatic amide or imide, aromatic oxime sulphonates, quinone diazides, and resins containing benzoin groups in the chain, such as those described in U.S. Pat. No. 4,368,253.

Suitable aromatic onium salts include those described U.S. Pat. Nos. 4,058,400 and 4,058,401. Suitable aromatic sulphoxonium salts which can be used include those described in U.S. Pat. Nos. 4,299,938, 4,339,567, 4,383,025 and 4,398,014. Suitable aliphatic and cycloaliphatic sulphoxonium salts include those described in European Patent Application Publication No. EP-A-0 164 314. Aromatic iodonium salts which can be used include those described in British Patent Specification Nos. 1 516 351 and 1 539 192. Aromatic iodosyl salts which can be used include those described in U.S. Pat. No. 4,518,676.

When the acid generating compound is an aromatic diazonium ion, the aromatic group may be unsubstituted or substituted by one or more arylthio, aryloxy, dialkylamino, nitro, alkyl or alkoxy group.

When a methallocenium salt is used, the initiator may have the formula

$$[(R^1)(R^2M)_a]^{+an}(an/q)[LQ_m]^{-q} \quad (III),$$

wherein a is 1 or 2, each of n and q independently of the other is an integer from 1 to 3, M is the cation of a monovalent to trivalent metal from groups IVb to VIIb, VII or Ib of the Periodic Table, L is a divalent to heptavalent metal or non metal, Q is a halogen atom or one of the groups Q may be a hydroxyl group, m is an integer corresponding to the valency of L+q, $R^1$ is a π-arene and $R^2$ is a π-arene or the anion of a π-arene.

Examples of sulphonate esters of aromatic alcohols containing a carbonyl group in a position alpha or beta to the sulphonate ester group and aromatic N-sulphonyloxyimides are those described in U.S. Pat. No. 4,618,564, preferably esters of benzoin or alpha-methylolbenzoin, especially benzoin phenyl sulphonate, benzoin-p-toluene sulphonate and 3-(p-toluenesulphonyloxy)-2-hydroxy-2-phenyl-1-phenyl-1-propanone, and N-sulphonyloxy derivatives of 1,8-naphthalimide, particularly N-benzenesulphonyloxy-and N-(p-docdecylbenzenesulphonyloxy)-1,8-naphthalimide.

Examples of aromatic oxime sulphonates are those described in European Patent Application Publication No. 0 199 672 or non-reactive derivatives of the reactive oxime sulphonates described in the cited publication. Particularly preferred oxime sulphonates are those of formula

$$R^3—C(R^4)=N—O—SO_2—R^5 \quad (IV),$$

wherein one of $R^3$ and $R^4$ denotes a monovalent aromatic group, especially phenyl or 4-methoxyphenyl, while the other denotes cyano, or $R^3$ and $R^4$, together with the carbon atom to which they are attached, form a carbocyclic or heterocyclic group, especially a fluorene or anthrone ring system, and $R^5$ denotes an aliphatic, carbocyclic, heterocyclic or araliphatic group, especially 4-tolyl, 4-chlorophenyl or 4-dodecylphenyl.

The oxime sulphonates can be prepared as described in the above-mentioned EP-A-0 199 672. The particularly preferred materials can be prepared by reacting an oxime of formula $R^3—C(R^4)=NOH$ with a sulphonyl chloride of formula $R^5SO_2Cl$, usually in an inert organic solvent in the presence of a tertiary amine.

Examples of quinone diazide compounds which can be used as curing agents include o-benzoquinone diazide sulphonyl or o-naphthoquinone diazide sulphonyl esters or amides of compounds, particularly aromatic compounds, having a hydroxy group or amino group respectively. Preferred are o-quinone diazides such as o-benzoquinione diazide sulphonyl and o-naphthoquinone diazide sulphonyl esters of phenols, including monohydric phenols and, particularly, polyhydric phenols such as 2,2-bis (hydroxyphenyl)propanes, dihydroxydiphenyls, di-and tri-hydroxy-substituted benzophenones, and phenolic resins, including phenol-aldehyde resin and polymers of phenols having polymerisable unsaturated substituents.

Examples of o-nitrophenyl acetals as curing agents are those prepared from an o-nitrobenzaldehyde and a dihydric alcohol, polyesters of such acetals prepared by reaction of the acetals with a polycarboxylic acid or reactive derivative thereof such as an anhydride, and end-capped derivatives of such acetals prepared by reacting the acetals with a carboxylic acid or reactive derivative thereof. Preferred are acetals derived from o-nitrobenzaldehyde and a linear alkylene glycol in which the alkylene group has 4 to 15 carbon atoms which may be interrupted by at least one oxygen atom, or a glycol or a cycloalkylenealkylene glycol, and polyester and end-capped derivatives of such acetals. Preferred linear glycols from which the acetals may be derived are 1,4-butanediol, 1,5-pentanediol, 1,6-hexanediol, 1,7-heptanediol, diethylene and dipropylene glycols and triethylene and tripropylene glycols. Preferred glycols having a cycloaliphatic ring are 2,2,4,4-tetramethyl-1,3-cyclobutanediol, bis(4-hydroxycyclohexyl)methane, 1,4-cyclohexanediol, 1,2-bis(hydroxymethyl)-cyclohexane and, especially, 1,4-bis(hydroxymethyl)cyclohexane.

Examples of polyesteracetals as curing agents are those prepared by reaction of the preferred acetals described above with an aromatic dicarboxylic or tricarboxylic acid or anhydride thereof, such as phthalic, terephthalic and trimellitic acids and their anhydrides, and mixtures of two or more thereof. An especially preferred polyesteracetal is that prepared by reacting an acetal derived from o-nitrobenzaldehyde and 1,4-bis(hydroxymethyl)cyclohexane with trimellitic anhydride. Preferred end-capped polyacetals are those prepared by reaction of the preferred acetals described above with monobasic carboxylic acid or reactive derivative thereof, such as acetic and benzoic acids and their chlorides.

As mentioned above, the composition of the invention may be cured by irradiation with a suitable UV light source which will vary on the nature of the UV curing cationic photoinitiator used. The length of the curing process will vary with the photinitiator used and will vary from a fraction of a second to at the most only a couple of minutes.

The amount of the UV curing cationic photoinitiator may be varied over a range depending on the photoinitiator used as is understood by those skilled in the art and varies from 0.1 to 10% or especially 0.5 to 4%. Where such cationic photoinitiators are used, it may be desirable to add a small amount (0.1 to 10 parts by weight, per 100 parts of component b)) of a sensitiser such as isopropyl-9H-thioxanthen-9-one (ITX) to accelerate the cure.

The UV curable compositions may also contain extra previously disclosed cycloaliphatic epoxy resins and or multifunctional alcohols along with suitable extenders, fillers and reinforcing materials, as long as they do not block the required UV light or remove the generated acid which is required for the cure.

The UV curable compositions of this invention may also be used as adhesives, primers for adhesives, laminating and casting resins, moulding compositions, putties and sealing compounds, potting and insulation compounds for the electronic industry, but especially as coatings. Also these compositions can be used in a process known as stereolithography, where a computer controlled UV laser is scanned on a bath of UV curable resin to produce 3-dimensional shapes for a variety of prototyping and other modeling applications.

The following Examples further illustrate the present invention.

EXAMPLE 1

A sample of 3,4-epoxycyclohexylmethyl-3,4-epoxycyclohexane carboxylate of epoxide content 7.3 mol/kg (71.7 g) and pentaerythritol ethoxylate (MW 770, 28.3 g) is heated at 100° C. under vacuum for 1 hour. The mixture is allowed to cool to room temperature and 10 g alumina (Activity grade Super 1, Type WN-6: Neutral are added. This mixture is heated under vacuum at 150° C. for 4 hours by which time the epoxide content has dropped to a value of 4.8 mol/kg. 5 g alumina are added and the reaction mixture heated under the same conditions for a further 3 hours. By this time the epoxide content has dropped to 4.6 mol/kg. A final addition of alumina (15 g) is made and heating continued, after a further 4 hours the epoxy value of the mixture is 3.5 mol/kg. The reaction mixture is allowed to cool and the catalyst removed by filtration.

EXAMPLE 2

A sample of 3,4-epoxycyclohexylmethyl-3,4-epoxycyclohexane carboxylate of epoxide content 7.3 mol/kg (64.8 g) and polyethylene glycol (MW 400, 34.2 g) are heated at 100° C. under vacuum for 1 hour. The mixture is allowed to cool to 80° C. and then 30 g aluminum oxide (Activated, Neutral, Brockman 1) added. This mixture is heated at 150° C. for 8 hours under vacuum by which time the epoxy content has fallen to 3.1 mol/kg. The reaction mixture is allowed to cool and the catalyst removed by filtration.

EXAMPLE 3

A sample of 3,4-epoxycyclohexylmethyl-3,4-epoxycyclohexane carboxylate of epoxide content 7.3 mol/kg (71.7 g) and pentaerythritol ethoxylate (MW 770, 28.3 g) are heated at 100° C. under vacuum for 1 hour. The mixture is allowed to cool to 80° C. and then Amberlyst (TM) 15 ion exchange resin (30 g) added. This mixture is heated under vacuum at 150° C. for 4 hours by which time the epoxy value has fallen to 3.6 mol/kg. The reaction mixture is allowed to cool and the catalyst removed by filtration.

EXAMPLE 4

A sample of 3,4-epoxycyclohexyl methyl-3,4-epoxycyclohexane carboxylate of epoxide content 7.3 mol/kg (62.8 g) and polytetrahydrofuran (MW=650, 37.2 g) are heated together at 100° C. under vacuum for 1 hour. The mixture is allowed to cool to 80° C. and then Amberlyst (TM) 15 ion exchange resin (30 g) added. This mixture is heated under vacuum at 150° C. for 8 hours by which time the epoxy value has fallen to 3.4 mol/kg. The reaction mixture is allowed to cool and the catalyst removed by filtration.

EXAMPLE 5

A sample of 3,4-epoxycyclohexylmethyl-3,4-epoxycyclohexane carboxylate of epoxide content 7.3 mol/kg (75.3 g) and polycaprolactone triol (MW=540, 24.7 g) are heated together at 100° C. under vacuum for 1 hour. The mixture is allowed to cool to 80° C. and then Amberlyst (TM) 15 ion exchange resin (30 g) added. This mixture is heated under vacuum at 150° C. for 10 hours by which time the epoxy value has fallen to 3.7 mol/kg. The reaction mixture is allowed to cool and the catalyst removed by filtration.

EXAMPLE 6

A sample of bis(3,4-epoxycyclohexylmethyl)adipate carboxylate of epoxide content 4.9 mol/kg (78.3 g) and pentaerythritol ethoxylate (MW 770, 21.7 g) are heated at 100° C. under vacuum for 1 hour. The mixture is allowed to cool to 800° C. and then Amberlyst (TM) 15 ion exchange resin (30 g) added. This mixture is heated under vacuum at 150° C. for 4 hours by which time the epoxy value has fallen to 2.6 mol/kg. The reaction mixture is allowed to cool and the catalyst removed by filtration.

EXAMPLE 7

A sample of 3,4-epoxycyclohexylmethyl-3,4-epoxycyclohexane carboxylate of epoxide content 7.3 mol/kg (85.2 g) and tripropylene glycol (14.89) are heated at 100° C. under vacuum for 1 hour. The mixture is allowed to cool to 80° C. and then Amberlyst (TM) 15 ion exchange resin (30 g) added. This mixture is heated under vacuum at 150° C. for 12 hours by which time the epoxy value has fallen to 4.7 mol/kg. The reaction mixture is allowed to cool and the catalyst removed by filtration.

EXAMPLE 8

A sample of 3,4-epoxycyclohexylmethyl-3,4-epoxycyclohexane carboxylate of epoxide content 7.3 mol/kg (84.5) and pentaerythritol ethoxylate are heated at 100° C. under vacuum for 1 hour. The mixture is allowed to cool to 80° C. and then Amberlyst (TM) 15 ion exchange resin (30 g) added. This mixture is heated under vacuum at 150° C. for 9 hours by which time the epoxy value has fallen to 4.4 mol/kg. The reaction mixture is allowed to cool and the catalyst removed by filtration.

EXAMPLE 9

A sample of 3,4-epoxycyclohexylmethyl-3,4-epoxycyclohexane carboxylate of epoxide content 7.3 mol/kg (79.8 g) and glycerol propoxylate (MW=420, 20.3 g) are heated at 100° C. under vacuum for 1 hour. The mixture is allowed to cool to 80° C. and then Amberlyst (TM) 15 ion exchange resin (30 g) added. This mixture is heated under vacuum at 150° C. for 16 hours by which time the epoxy value has fallen to 4.2 mol/kg. The reaction mixture is allowed to cool and the catalyst removed by filtration.

EXAMPLE 10

A sample of 3,4-epoxycyclohexylmethyl-3,4-epoxycyclohexane carboxylate of epoxide content 7.3 mol/kg (64.8 g) and polyethylene glycol (MW 400, 34.2 g) are heated at 100° C. under vacuum for 2 hour. The mixture is allowed to cool to 80° C. and then Activated Carbon (Darco, 20–40 mesh, 20 g) added. This mixture is heated at 150° C. for 8 hours under vacuum by which time the epoxy content has fallen to 2.8 mol/kg. The reaction mixture is allowed to cool and the catalyst removed by filtration.

EXAMPLE 11

A sample of 3,4-epoxycyclohexylmethyl-3,4-epoxycyclohexane carboxylate of epoxide content 7.3 mol/kg (66.6 g) and polycaprolactone diol (MW=550, 33.4 g) are heated together at 100° C. under vacuum for 1 hour. The mixture is allowed to cool to 80° C. and then Amberlyst (TM) 15 ion exchange resin (30 g) added. This mixture is heated under vacuum at 150° C. for 10 hours by which time the epoxy value has fallen to 3.4 mol/kg. The reaction mixture is allowed to cool and the catalyst removed by filtration.

EXAMPLE 12

A sample of 3,4-epoxycyclohexylmethyl-3,4-epoxycyclohexane carboxylate of epoxide content 7.3 mol/kg (88.0 g) and Boltorn (TM) H20 (12.0 g) are heated together at 100° C. under vacuum for ½ hour. The mixture is allowed to cool to 70° C. and then Amberlyst (TM) 15 ion exchange resin (30 g) added. This mixture is heated under vacuum at 150° C. for 10 hours by which time the epoxy value has fallen to 5.4 mol/kg. The reaction mixture is allowed to cool and the catalyst removed by filtration.

EXAMPLE 13

A sample of 3,4-epoxycyclohexylmethyl-3,4-epoxycyclohexane carboxylate of epoxide content 7.3 mol/kg (88.0 g) and Boltorn (TM) H30 (12.0 g) are heated together at 100° C. under vacuum for ½ hour. The mixture is allowed to cool to 60° C. and then Amberlyst (TM) 15 ion exchange resin (30 g) added. This mixture is heated under vacuum at 150° C. for 6 hours by which time the epoxy value has fallen to 5.4 mol/kg. The reaction mixture is allowed to cool and the catalyst removed by filtration.

EXAMPLE 13a

Use of Denditric Polyol having a Higher Molecular Weight Functionality

A sample of 3,4-epoxycyclohexylmethyl-3,4-epoxycyclohexane carboxylate of epoxide content 7.7 mol/kg (87.4 g) and Boltorn H40 (12.6 g) were heated together at 100° C. under vacuum for ½ hour. The mixture was allowed to cool to 60° C. and then Amberlyst (TM) 15 ion exchange resin (31.5 g) is added. This mixture was heated under vacuum at 150° C. for 4 hours by which time the epoxy value had fallen to 5.3 mol/kg. The reaction mixture was allowed to cool and the catalyst removed by filtration.

EXAMPLE 13b

Reusing the Catalyst Used in a Previous Reaction

A sample of 3,4-epoxycyclohexylmethyl-3,4-epoxycyclohexane carboxylate of epoxide content 7.7 mol/kg (87.4 g) and Boltorn H40 (12.6 g) were heated together at 100° C. under vacuum for ½ hour. The mixture was allowed to cool to 60° C., and then the filtered but unwashed catalyst (70% Amberlyst (TM) 15 ion exchange resin) from above example 13a (44.7 g) is added. This mixture was heated under vacuum at 150° C. for 7 hours by which time the epoxy value had fallen to 5.6 mol/kg. The reaction mixture was allowed to cool and the catalyst removed by filtration.

EXAMPLE 14

The product as prepared to the method according to Example 11 (78%) is mixed at 100° C. with cis-1,2,3,6-tetrahydrophthalic anhydride (23%) to give a clear solution. This is K-bar coated (No.8, 100 μm) onto degreased, chromic acid etched aluminum test pieces and made into a lap-shear joint of 12.5 mm overlap. This is cured in an oven at 150° C. for 30 minutes to give a firmly bonded joint.

EXAMPLE 15

The product as prepared to the method according to Example 13 (96%) is mixed at room temperature with Cyracure (TM) UVI 6990 to give a clear solution. This is K-bar coated (No.8, 100 μm) onto a degreased, chromic acid etched aluminum test piece, place on a conveyor belt and passed twice under a Fusion (TM) UV lamp containing a D-bulb, running at 5 m/minute, to give a tack free, scratch resistant coating (CYRACURE UVI 6990 is a mixed triarylsulphonium hexafluorophosphate salt supplied by Union Carbide as a 50% solution in propylene carbonate).

What is claimed is:

1. A process for the preparation of liquid products, having an epoxide content greater than 0.1 mo/kg, resulting from the reaction of cycloaliphatic epoxides with multifunctional hydroxy compounds which comprises reacting a polyfunctional cycloaliphatic epoxy resin with a multifunctional hydroxy compound in the presence of a heterogeneous surface-active catalyst selected from the group consisting of activated aluminum hydroxide, hydrated aluminum oxide, amorphous silica, activated carbon and cationic ion exchange resins and isolating the reaction product.

2. The process according to claim 1, which comprises reacting a polyfunctional cycloaliphatic epoxy resin selected from the group consisting of 3,4-epoxycyclohexylmethyl-3, 4-epoxycyclohexane carboxylate and bis (3,4-epoxycyclohexyl methyl) adipate carboxylate.

3. The process according to claim 1, which comprises reacting a multifunctional hydroxy compound selected from the group consisting of pentaerythritol ethoxylate, polyethylene glycol, polytetrahydrofuran, polycaprolactone diol or triol, tripropylene glycol, glycerol propoxylate and dendritic polyols.

4. The process according to claim 1, which comprises reacting the epoxy resin with a multifunctional hydroxy compound in the presence of activated, porous, solid aluminum hydroxide having the general formula $Al_2O_{(3-x)}(OH)_{2x}$ where x ranges from about 0 to 0.8.

5. The process according to claim 1, which comprises reacting the epoxy resin with a multifunctional hydroxy compound in the presence of hydrated aluminum oxide selected from the group consisting of crystalline aluminum hydroxide and gelatinous crystalline aluminum hydroxide.

6. The process according to claim 1, which comprises reacting the epoxy resin with a multifunctional hydroxy compound in the presence of amorphous silica selected from the group consisting of silica sols or colloidal silica, silica gels, precipitated silica and pyrogenic or fumed silica.

7. The process according to claim 1, which comprises reacting the epoxy resin with a multifunctional hydroxy compound in the presence of liquid-phase activated carbon in powder, granular or shaped form.

8. The process according to claim 1, which comprises reacting the epoxy resin with a multifunctional hydroxy compound in the presence of macroporous or macroporous crosslinked sulphonated polystyrene or crosslinked polyacrylic cationic ion exchange resins.

9. The process according to claim 1 which comprises reacting at elevated temperature the polyfunctional cycloaliphatic epoxy resin with the multifunctional hydroxy compound in the presence of a heterogeneous surface-active catalyst of claim 1.

10. The process according to claim 1 which comprises cooling the reaction mixture, removing the catalyst, and isolating the reaction product.

* * * * *